United States Patent [19]

Kato et al.

[11] Patent Number: 5,054,197
[45] Date of Patent: Oct. 8, 1991

[54] METHOD FOR JOINING SYNTHETIC RESIN STRUCTURAL MEMBERS

[75] Inventors: Kanji Kato, Chiba; Kesaaki Mochizuki, Inashiki; Akira Hamamoto, Yokosuka; Hiroshi Oya, Tokyo; Kozo Ando, Tokyo; Kazuo Namaritani, Nara; Kenichi Fujita, Takatsuki; Futami Nagaoka, Yokohama, all of Japan

[73] Assignees: Ishikawajima-Harima Jukogyo Kabushiki Kaisha; Nippon Shokubai Kagaku Kogyo Co., Ltd., both of Japan

[21] Appl. No.: 493,143

[22] Filed: Mar. 13, 1990

[30] Foreign Application Priority Data

Mar. 16, 1989 [JP] Japan .................................. 1-64641

[51] Int. Cl.⁵ ............................................. B23P 11/02
[52] U.S. Cl. ................................. 29/897.31; 29/897.3; 29/525.1; 29/525.2
[58] Field of Search .................. 29/897, 897.3, 897.31, 29/897.312, 897.33, 897.34, 525.2, 525.1, 495, 469; 52/655; 403/300, 305, 167

[56] References Cited

U.S. PATENT DOCUMENTS

| | | | |
|---|---|---|---|
| 883,499 | 3/1908 | Smith | 403/305 |
| 1,486,549 | 3/1924 | Schuette | 403/305 |
| 1,913,097 | 6/1933 | Wallis | 29/897.31 |
| 4,848,954 | 7/1989 | Wiseman | 29/525.1 |
| 4,934,861 | 7/1990 | Weeks et al. | 403/408.1 |

*Primary Examiner*—P. W. Echols
*Assistant Examiner*—David P. Bryant

[57] ABSTRACT

A method for joining a structural member made of a synthetic resin such as fiber reinforced plastic (FRP) with a further synthetic resin or other structural member. The method is effective when using synthetic resin members instead of conventional lumber or steel members in a main framework of a cooling tower. FRP members increase the corrosion resistance and simplify the assembly of such towers.

2 Claims, 5 Drawing Sheets

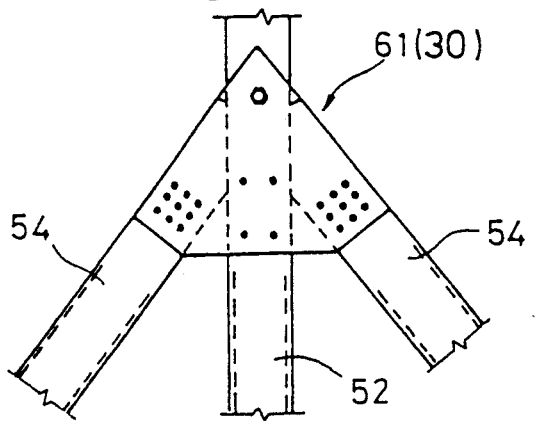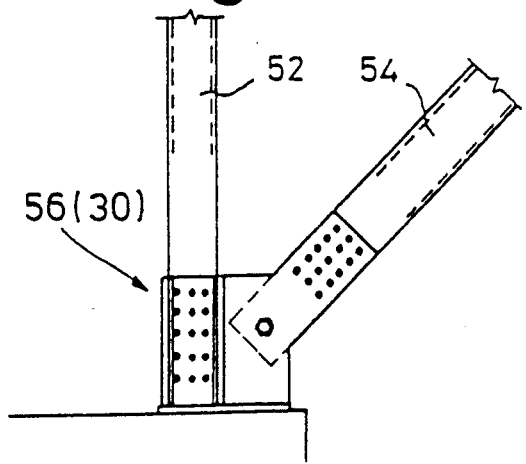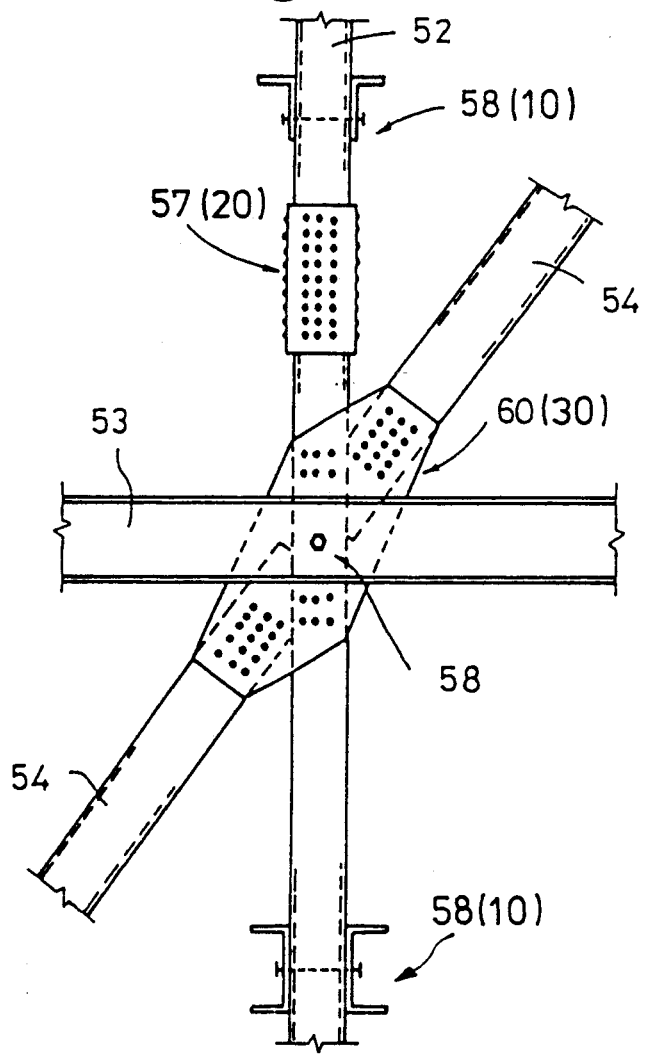

METHOD FOR JOINING SYNTHETIC RESIN STRUCTURAL MEMBERS

BACKGROUND OF THE INVENTION

The present ivnention relates to a method for joining a structural member made of a synthetic resin such as fiber reinforced plastic (FRP) with a further synthetic resin or other structural member. The method is effective when using synthetic resin members instead of conventional lumber or steel members in a main framework of a cooling tower. FRP members increase the corrosion resistance and simplify the assembly of such towers.

There have been used many structural members made of synthetic resins instead of lumber and metals. However, such synthetic resin members have been hardly used as structural members which will receive a heavy load.

For instance, in the field of a cooling tower for cooling warm water through direct contact with a large quantity of surrounding air, synthetic resin members have been used only partially for a small-sized cooling tower for air-conditioning or the like.

Generally, a larger-sized cooling tower used in various chemical industries has a main framework made of lumber or steel. Though being typically composed of Douglas fir lumber processed for pressure-preservative treatment or steel members plated with zinc hot dip galvanizing, a main framework still tends to be easily corrqded since the framework of a larger-sized tower cooiing atmosphere of is in an extremely high temperature and extremely high humidity.

The frameworks composed of lumber or steel members will begin to be corroded in about ten or 7-8 years' time, respectively, at and around the upper portion of the framework adjacent to a distribution system, which requires repairing of the tower.

As the corrosion spreads, corroded lumber pieces or rust particles will disperse into the cooled water, which may result in deterioration of performance of the cooling tower such as clogging of strainer means in the water-cooling system or increase in pump loads.

Therefore, it may be proposed to construct the main framework using synthetic resins such as FRP which have a high degree of corrosion resistance even in the corrosive atmosphere. However, there are many points to be considered, prior to use of FRP, such as the buckling strength of FRP, influence on the strength of FRP due to absorption of water and its anti-weathering capability. Furthermore, structures for joining of synthetic resin structural members such as FRP members must be developed.

The present invention was made to overcome the above and other problems encountered in conventional cooling towers and has for its object to enable a synthetic resin structural member to be readily and securely joined with a further synthetic resin or other structural member.

The inventors made extensive studies and experiments of anti-corrosion of structural materials to find that synthetic resins are employable for structural members; e.g., FRP members may be used to compose a main framework of a cooling tower.

In order to attain the tasks of the present invention, when a hollow synthetic resin structural member is to be joined by a bolt with a further structural member or members, the bolt is inserted into the hollow member through said further structural member(s) and a distance piece is fitted in the hollow member and then is tightened so that a secure joint between the structural members can be ensured without causing deformation in cross section of the hollow structural member.

When synthetic resin structural members are to be joined together, a connector with a plurality of previously drilled holes is joined to the structural members by drilling holes in the structural members in alignment with the holes of the connector and striking blind rivets into the thus drilled holes one by one. Therefore, the blind rivet holes have a substantially uniform degree of accuracy and the joint work at a site or field is facilitated.

When a hollow synthetic resin structural member is to be joined with another synthetic resin structural member, a connector is attached to the hollow member by means of bolting through a distance piece fitted in the hollow member so as to prevent deformation in cross section thereof. The connector is then joined to the other structural member by blind rivets. While reducing the number of blind rivets to be struck and thus relieving the riveting work or operation, a secure joint between the structural members can be ensured.

The present invention will become more apparent from the following description of preferred embodiments thereof taken in conjunction with the accompanying drawings.

The same reference numerals are used to designate similar parts throughout the figures.

BRIEF DESCRIPTION OF THE DRAWINGS

FIG. 6(a) is an enlarged elevation of an upper connector used in the main framework shown in FIG. 5;

FIG. 6(b) illustrates, on an enlarged scale, a vertical connector, a bolt connector and a bracing connector used in the main framework shown in FIG. 5; and FIG. 6(c) is an enlarged elevation of a foundation connector used in the main framework shown in FIG. 5.

DETAILED DESCRIPTION OF THE PREFERRED EMBODIMENTS

Figure 1A:
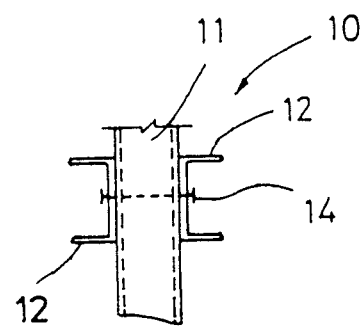
FIG. 1(a) is an elevation front view of a first preferred embodiment of the present invention when a hollow synthetic resin structural member is joined with a further structural member or members.
Figure 1B:
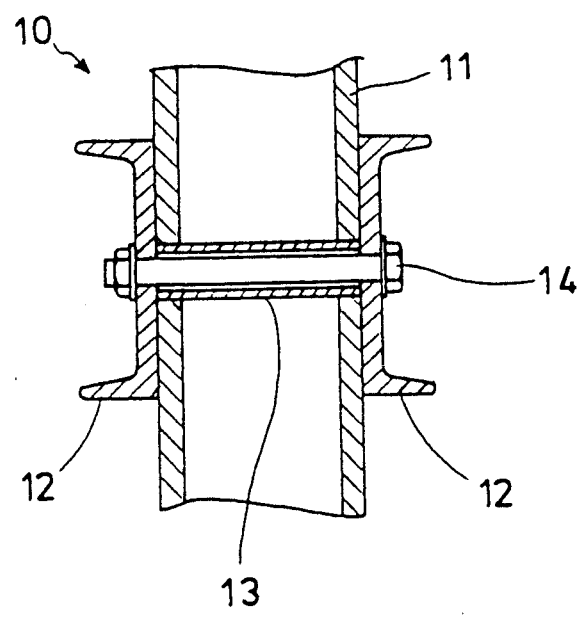
FIG. 1(b) is a sectional view, on enlarged scale, thereof.

FIGS. 1(a) and 1(b) illustrate a first embodiment of the present invention.

A joint structure 10 serves to join a hollow synthetic resin structural member 11, such as an FRP rectangular hollow pipe in cross section, with a metal or FRP shaped bar or bars.

A distance piece 13 made of a metal or a synthetic resin is fitted through the holes on the opposite walls of the hollow member 11 such that opposite end faces of the distant piece 13 are coplanar with the opposite walls of the member 11.

The distance piece 13 may be annular or other configuration in cross section and may have a rib extending therefrom so as to enhance the buckling strength.

In joining, a structural member or members 12 made of a metal or a synthetic resin and each having a bolt hole are positioned on the hollow member 11 so as to align the bolt hole(s) with the distance piece 13. Thereafter the bolt 14 is inserted through the bolt hole(s) of the structural member(s) 12 and distance piece 13 as shown in FIG. 1(b) and is tightened.

With the joint structure 10, the distance piece 13 will substantially prevent deformation in cross section of the hollow member 11 and ensure a strong joint in use of a bolt 14, thus preventing any loosening due to deformation.

Figure 2:
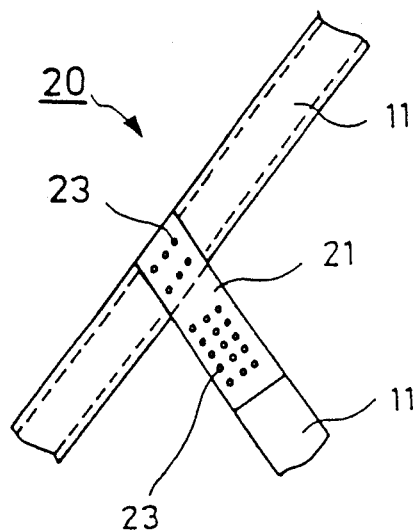
FIG. 2 illustrates a second preferred embodiment of the present invention when synthetic hollow resin structural members are intersectingly joined together.

Next referring to FIG. 2, joining of the synthetic resin structural members will be described.

With a joint structure 20, synthetic resin structural members 11 are intersectingly joined together by a connector 21 and blind rivets 23.

The connector 21 which is made of a metal or a synthetic resin is in the form of a pair of plates. Alternatively, the connector 21 is in the form of a rectangular hollow pipe in cross section adapted to fit over the one member 11 and has a pair of plate-like extensions spaced apart from each other by a distance substantially equal to the width of the other member 11 so as to sandwich the latter. The pair of plates or plate-like extensions are cut off at their tips to define a predetermined angle of intersection of the connector 21 with the other member 11. The connector 21 has a plurality of previously drilled blind rivet holes 23.

In joining, the members 11 are abutted against each other at the predetermined angle and are sandwiched at the abutment by the connector 21 in the form of paired plates; alternatively, the one member 11 is fitted into the connector 21 in the form of the rectangular hollow pipe in cross section and the other member 11 is sandwiched by the paired plate-like extensions of the connector 21, thereby abutting the members 11 against each other at the predetermined angle. Then, a plurality of blind rivet holes are drilled one at each time through the hollow members 11 such that the blind rivet holes thus drilled are in alignment with those previously drilled on the connector 21. Whenever one hole is drilled through the members 11, one blind rivet 23 is struck thereinto. The blind rivet used is a conventional one comprising a flange and a shaft. By work or operations from the exterior of the connector 21, the latter can be securely joined to the structural members 11, thereby joining the structural members together.

Figure 3A:
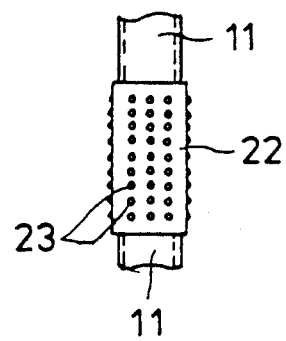
FIG. 3(a) is an elevation of a third preferred embodiment of the present invention when hollow synthetic resin structural members are joined together along their axes.
Figure 3B:
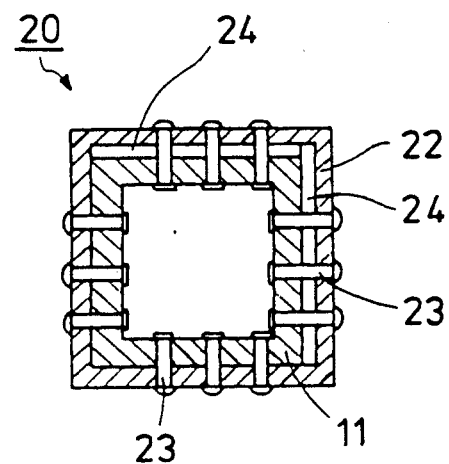
FIG. 3(b) is a sectional view, on an enlarged scale, thereof.

Referring next to FIG. 3, the joining of two hollow synthetic resin structural members 11 along their axes will be described. A hollow connector 22 is adapted to receive therein the hollow members 11 and are made of for example a metal or synthetic resin rectangular material in cross section. Each side surface of the connector 22 has a plurality of previously drilled holes for blind rivets 23.

In joining, the structural members 11 to be joined together are fitted into the connector 22 and are abutted against each other. Then, spacers 24 are fitted into any clearance between the connector 22 and the members 11. Then, a plurality of holes are drilled through the members 11 one at a time such that they are aligned with the previously drilled holes of the connector 22. Whenever one hole is drilled, one blind rivet is struck into said newly drilled hole. In this way, the structural members 11 are joined together with the connector 22 surrounding them.

According to the joint structure 20 with the connector 21 or 22 and the blind rivets 23, a plurality of holes are drilled one at a time through the members 11 and whenever one hole is drilled, one blind rivet 23 is struck into the newly drilled hole. Such an operation of drilling a hole and striking a blind rivet thereinto is repeated. As a result, even when a large number of blind rivets are used, the rivet holes are drilled with a high degree of accuracy so that the load is uniformly distributed and supported by the blind rivets 23.

If a plurality of bolts were used to join synthetic resin structural members together, the tolerable load to be estimated would remain unchanged and be the same as that for the case of a single bolt being used since bolt holes respectively drilled in the structural members and connector were to respectively have a diameter of a bolt plus 2 or 3 mm from the viewpoint of machining and installation accuracies.

The machining accuracy of the bolt holes in the case of plural bolts being used might be enhanced by drilling bolt holes in the synthetic resin structural member at a site or field so as to be aligned with the previously formed holes on the connector. However, in fact, it is next to impossible to drill, at a site or field, holes for insertion of a bolt on opposed walls of a hollow pipe with a high degree of accuracy.

However, in the case of the joint structure 20, the blind rivets 23 and the connector 21 or 22 which do not require to drill the opposite holes of the hollow pipe are used and drilling of holes at a site or field is effected only to make blind rivet holes in the pipe wall which will ensure high degree of accuracy. Whenever a new hole is drilled, a blind rivet is struck thereinto. This is repeated to securely join the structural members together. Such an operation can be carried out readily at a site or field, ensuring a strong joint by the blind rivets 23 which receive the uniformly distributed load.

Joint strength can be freely adjusted by increasing or decreasing the number of the blind rivets 23 used.

In assembling, there is no need of tightening a bolt at the hollow portion of the structural member so that the assembling can be much facilitated.

Figure 4A:
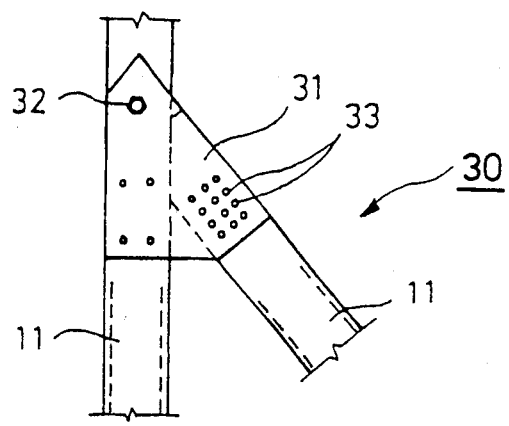
FIG. 4(a) is an elevation of a fourth embodiment of the present invention when a hollow synthetic resin structural member is intersectingly joined with another synthetic resin structural member.
Figure 4B:
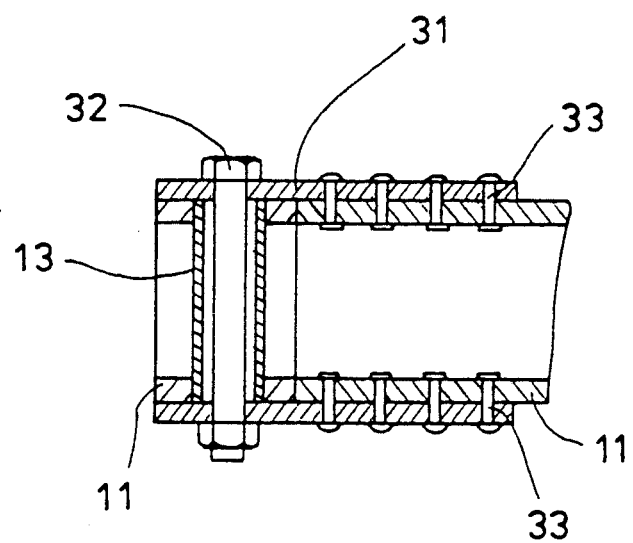
FIG. 4(b) is a sectional view, on an enlarged scale, thereof.

Referring next to FIGS. 4(a) and 4(b), a joint structure 30 between a hollow synthetic resin structural member and another synthetic resin structural member will be described.

With the joint structure 30, the structural members 11 are joined together with a connector 31, a bolt 32 and blind rivets 33 so as to reduce the number of blind rivets used and thus relieve the riveting operation.

The joint structure 30 has a distance piece 13 which is substantially similar to that described with respect to the joint structure 10 and which is fitted into the joint portion of the hollow member 11 so that the structural members 11 can be securely joined together by a bolt 32.

The connector 31 is made of a metal or a synthetic resin and is so formed that its shape corresponds to the joint angle between the members 11. The connector 31 has a previously drilled bolt hole and a plurality of previously drilled blind rivet holes.

In joining, the connector 31 is placed on the one of the members 11 to align the bolt hole on the connector 31 with the distance piece 13 and then the bolt 32 is inserted to be tightened.

Thereafter, the other member 11 is positioned on the portion of the connector 31 which has the blind rivet holes. An operation of drilling blind rivet holes on the other member 11 one at a time in alignment with the holes of the connector 31 and striking a blind rivet 33 into the newly drilled hole is repeated until a predetermined number of blind rivets 33 are struck.

If necessary, the portion of said one member 11 to be overlapped with the connector 31 may have further blind rivet holes and the drilling and riveting operation just described above is repeated so that the joint strength can be increased.

According to such joint structure 30, the joint structure for joining the structural members by one bolt with a high degree of accuracy is combined with the joint structure in which the blind rivets 33 and the connector 31 which do not require to drill the opposite holes of the hollow pipe are used and drilling of holes at a site or field is effected only to make blind rivet holes on the pipe wall which will ensure high degree of accuracy. As a result, the number of blind rivets to be struck at a site or field can be decreased and the joint work is facilitated. A plurality of blind rivets bear a uniformly distributed load and the secure joint is ensured.

In this case, it is also possible to freely adjust the joint strength by selecting the number of the blind rivets 33 used.

Moreover, there is no need of tightening a bolt at the hollow portion of the pipe so assembly is facilitated.

Figure 5:
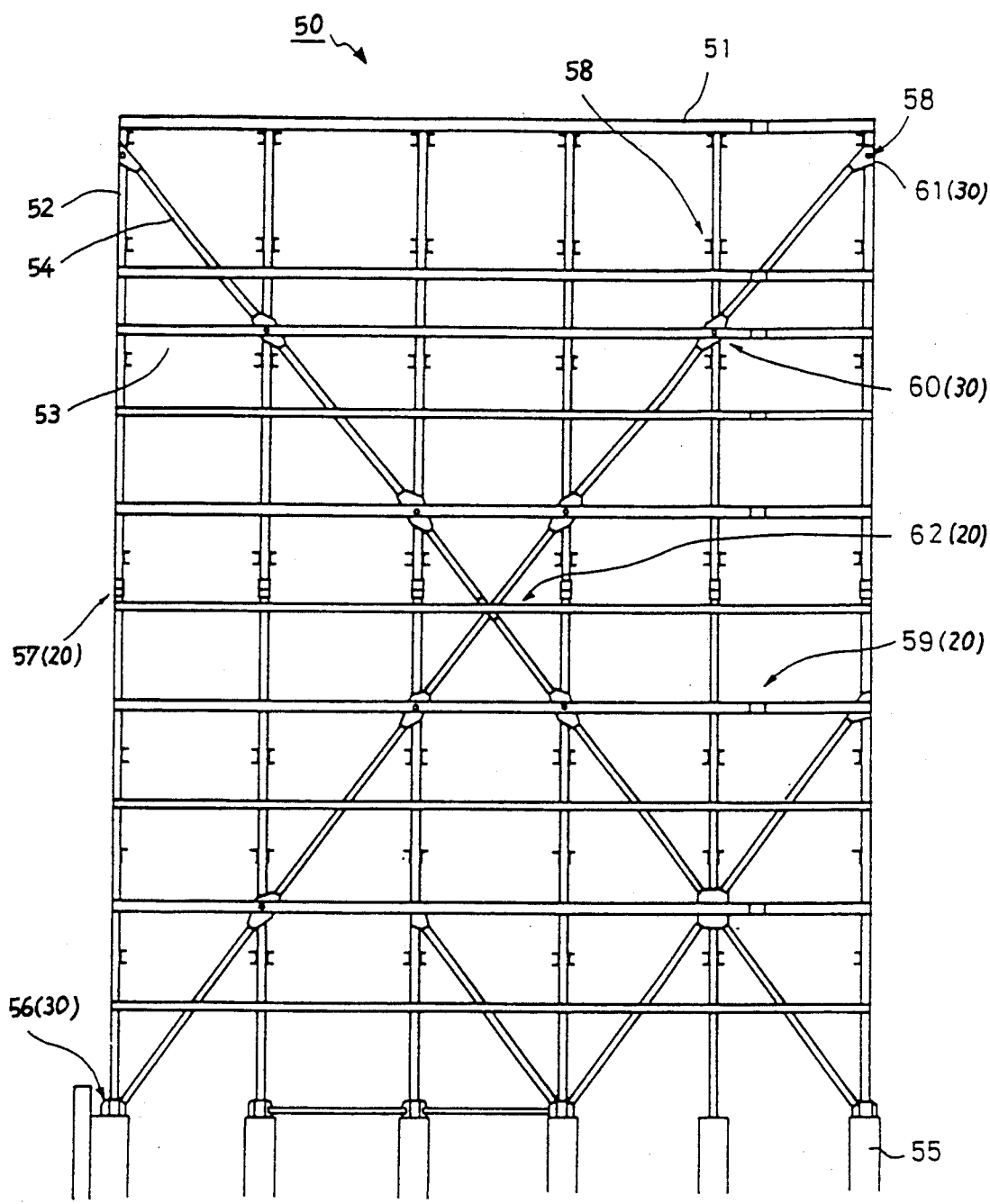
FIG. 5 illustrates an application of the present invention to assembling of a main framework of a cooling tower.

Referring next to FIGS. 5 and 6, assembling of a main framework of a cooling tower using the above-described joint structures 10, 20 and 30 and the FRP structural members will be described.

A cooling tower 50 has a main framework 51 composed of FRP members. More particularly, columns 52 are in the form of a rectangular hollow pipe in cross section made of FRP; transverse beams 53 are in the form of rectangular shaped bars made of FRP; and enforcing cross beams 54 are in the form of a rectangular hollow pipe in cross section made of FRP as in the case of the columns 52.

These FRP members are preliminarily subjected to various tests and experiments in order to measure their buckling strength and influence on their strength due to absorption of water. On the basis of the measured results, selection is made as to material composition, cross section and wall thickness of the members.

In assembling the framework 51, if the FRP members were connected with each other, as in the case of lumber structural members, by means of a connector having pawls to be struck into the members, a satisfactory degree of joint strength would not be attained. On the other hand, when the FRP members were drilled at a site or field, as in the case of steel structural members, so as to have a plurality of holes equal in pitch and size to the holes on a connector to be used and were joined by bolting, it would be still difficult to ensure a satisfactory degree of joint strength.

Especially in the case of an FRP hollow pipe, bolt holes would have to be drilled in opposite walls of the pipe since no bolt can be tightened at the hollow portion of the pipe. Such drilling of holes in the opposite walls of an FRP hollow pipe at a site or field would be extremely difficult. Moreover, tightening of an FRP hollow pipe by means of a through bolt would tend to cause deformation of the pipe itself. Thus, the conventional connection systems are hardly applicable to the invention.

Therefore, according to the present invention, the above-described joint structures 10, 20 and 30 are used depending upon the shape of members to be joined as well as the required strength in the joint. Blind rivets are struck through the connector into the wall of the hollow pipe for the joint from the outside of the same. When increased joint strength is required, a structure which causes no deformation of the pipe even in tightening of the bolt is used together with the blind rivets.

Each of the lowermost columns 52 is securely anchored at its lower end with a foundation connector 56 using the joint structure 30 to a foundation 55 made of concrete and constructed to surround a cooled water basin. The columns 52 are axially joined by vertical connectors 57 using the joint structures 20 so as to have a predetermined overall height of the tower 50.

The transverse beams 53 for the horizontal joint of the columns 52 are securely joined to the columns 52 by bolts each extending through a distance piece fitted in the column 52 at a bolt connection 58 corresponding to the joint structure 10. The transverse beams 53 are joined by horizontal connectors 59 using the joint structures 20 so as to have a predetermined overall width of the tower 50.

In order to reinforce the columns 52 and the beams 53, cross beams 54 are diagonally arranged and are axially joined together by bracing connectors 60 using the joint structures 30 at points of intersection of the columns 52 with the beams 53. Each of the lowermost bracings 54 is securely anchored at its lower end to a foundation connector 56. The upper end of each of the uppermost bracing 54 is joined to the associated column 52 by an upper connector 61 using the joint structure 20. The joint at the intersection between the bracings 54 is carried out by an intersection connector 62 using the joint structure 20.

Use of the above-described connectors 56 to 62 depending upon the shapes of respective connections enables the FRP rectangular hollow pipe in cross section and FRP shaped bars to be securely joined.

As a result, during the assembly of the cooling tower 50, the joint work is much facilitated. Joint-work efficiency is much improved since use of FRP materials contributes to decrease in weight of the structural members to be used.

In the completed or assembled cooling tower 50, resistance to corrosion is remarkably improved to increase the service life of the tower. Substantially no contaminants such as lumber pieces or rust particles are admixed in the cooled water and the operational control is simplified.

So far the synthetic resin structural members have been described as being FRP rectangular hollow pipes in cross section and FRP shaped bars. But, it is to be understood that the pipes may be made of other synthetic resins and have any cross section other than rectangle.

The connectors may not be made of metals but synthetic resins such as FRP. Their shapes or configuration may be changed as needs demand.

Synthetic resin structural members are not limited to be made of composite materials FRP in a narrower sense to which thermosetting plastics are matrixes but are directed to reinforced plastics in a wider sense including FRTP (fiber reinforced thermo-plastics).

It is of course apparent to those skilled in the art that respective component parts may be replaced by any equivalents without departing from the true spirit of the present invention.

As is clear from the above-mentioned embodiments, according to the present invention, when a hollow synthetic resin structural member is to be joined by a bolt with a further structural member or members, the bolt is inserted into the hollow member through said further structural member(s) and a distance piece fitted in the hollow member and then is tightened so that a secure joint between the structural members can be ensured without causing deformation in cross section of the hollow structural member.

When synthetic resin structural members are to be joined together, a connector with a plurality of previously drilled holes is joined to the structural members by drilling holes in the structural members in alignment with the holes of the connector and striking blind rivets into the thus drilled holes one by one. Therefore, the blind rivet holes have a substantially uniform degree of accuracy and the joint work at a site or field is facilitated.

When a hollow synthetic resin structural member is to be joined with another synthetic resin structural member, a connector is attached to the hollow member by means of bolting through a distance piece fitted in the hollow member so as to prevent deformation in the cross section thereof. The connector is then joined to the other structural member by blind rivets. While reducing the number of blind rivets to be struck and thus relieving the riveting work or operation, a secure joint between the structural members can be ensured.

As a result, when the present invention is applied to the assembly of a main framework of a cooling tower made of FRP structural members, corrosion at a high temperature and a high degree of humidity can be prevented and its service life can be remarkably increased as compared with the conventional framework made of lumber or steel. Moreover, contamination of the cooled water with corroded particles or the like can be prevented; the operational control can be facilitated; and the stabilized performance can be ensured without causing the degradation of the performance.

What is claimed is:

1. A method for joining a pair of hollow, synthetic resin structural members, comprising the steps of placing over an abutment between the structural members a hollow pipe connector with a pair of plate-like extensions having a plurality of previously drilled holes therein and drilling new holes through the structural members one at a time such that they are aligned with said previously drilled holes of the extensions, and whenever a new hole is drilled, striking one blind rivet into said new hole, thereby joining the synthetic resin structural members together.

2. A method for joining first and second hollow, synthetic resin structural members, comprising the steps of providing a connector having a previously drilled hole for a bolt and a plurality of previously drilled holes for blind rivets, inserting a distance piece into a hollow portion of said first member so as to prevent deformation in cross section of said first member upon bolting, inserting a bolt through the connector and distance piece and tightening said bolt, placing the connector over said second structural member for use as a template for drilling aligned holes in said second structural member, drilling new holes through said second structural member one at a time such that they are aligned with said previously drilled holes of the connector, and whenever a new hole is drilled, striking one blind rivet into said new hole, thereby joining the synthetic resin structural members together.

* * * * *